United States Patent Office.

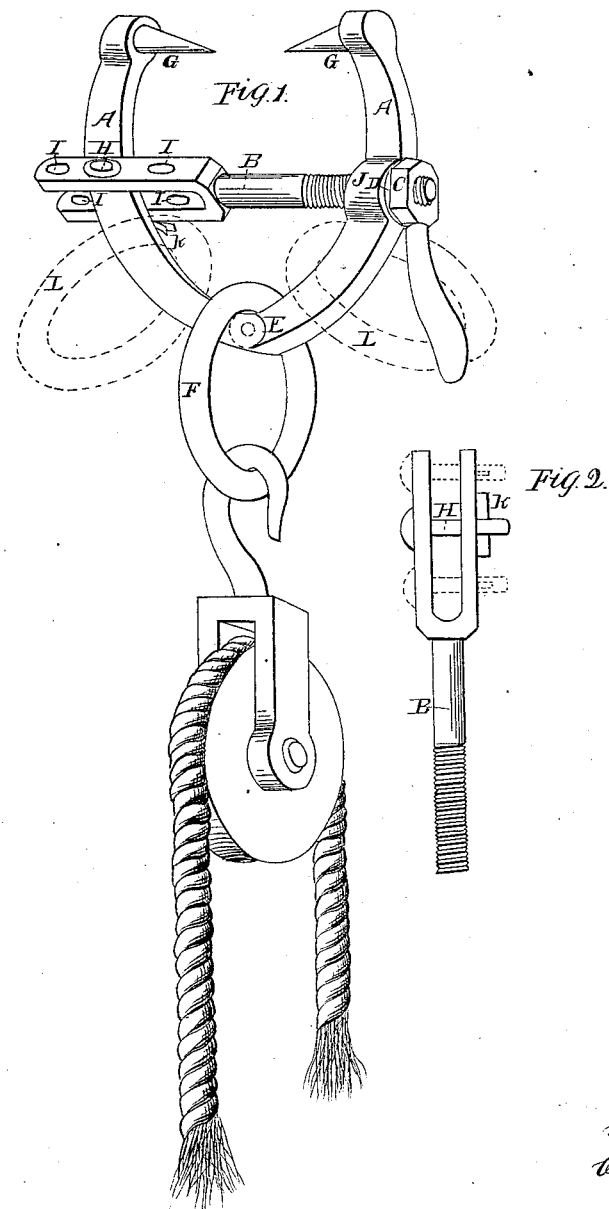

GEORGE B. AND CLARK LEWIS, OF ADAMS' CENTRE, NEW YORK.

Letters Patent No. 60,758, dated January 1, 1867.

IMPROVEMENT IN DEVICE FOR SUSPENDING HORSE HAY-FORKS, &c.

*The Schedule referred to in these Letters Patent and making part of the same.*

TO ALL WHOM IT MAY CONCERN:

Be it known that we, GEORGE B. and CLARK LEWIS, of Adams' Centre, in the county of Jefferson, and State of New York, have invented a new and useful Device for Suspending Horse Hay-Forks, Falls, etc.; and we do hereby declare that the following is a full, clear, and exact description of the construction and operation of the same, reference being had to the annexed drawing, making a part of this specification, in which—

Figure 1 is a perspective view of said clutch or device.

A A are two circular bars of iron, or other strong material, with two steel and tempered points or clutches, G G, at one end, turned inward, and a joint, E, at the other end, allowing the points G G to recede or come together, and, with a hole passing through one of them at J, to allow a crotched-ended bolt, B, to pass through it, and the other one has a small hole transversely through it at H, fig. 1, to receive a bolt, H. B is a side view of the crotched-ended bolt represented in Figure 2, with the bolt H and a spring key in it at K. Said bolt, H, in fig. 1, passes through both the crotched-ended bolt B and circular clutch bar A; and a handle nut C and washer D, at the other end of the crotched-ended bolt B, are for the purpose of tightening and holding or loosening the circular clutch bars A A, to cause them to crowd in the points G G, or loosen them, at pleasure. I I are two or more extra holes through the crotched-ended bolt B, for the purpose of the bolt H being shifted to the other holes, I I, thereby allowing the circular clutch bars A A to recede at a greater distance or come together nearer, to conform to different-sized timbers or rafters, or any other thing to which the clutch is to be suspended or fastened. F, in fig. 1, is a ring slipped loosely on to the circular clutch bars A A, to attach the horse hay-fork, fall, or any other thing to be suspended or held. The ring F slides loosely along the circular clutch bars A A, to the dotted oval circular lines, L L, to conform to a draught in different directions.

The above-described device may be made fast to a beam, rafter, or any available point of support, for the purpose of affording a means of suspension for horse hay-forks, falls, or other devices, which are employed for elevating or sustaining weighty substances.

What we claim as our invention, and desire to secure by Letters Patent, is—

1. A clutch, for suspending horse hay-forks, etc., consisting of the movable and adjustable bars A A, pivoted together and having penetrative points, G G, substantially as described and for the purpose set forth.

2. In combination with the above, the crotched bolt B, handle nut C, and bolt H, applied and operating substantially as and for the purpose specified.

3. The sliding or movable ring F, in combination with the adjustable clutch A A, as and for the purpose specified.

GEORGE B. LEWIS,
CLARK LEWIS.

Witnesses:
DANIEL FAY, 2d,
CHAS. F. LEWIS.